June 7, 1949.  F. L. LAVASH  2,472,750
MULTIPLE CLUTCH
Filed Dec. 21, 1945

Inventors
Francis L. Lavash
By Spear&Spear
Attorneys

Patented June 7, 1949

2,472,750

UNITED STATES PATENT OFFICE 2,472,750

MULTIPLE CLUTCH

Francis L. Lavash, Dedham, Mass., assignor to Kinney Manufacturing Company, Jamaica Plain, Mass., a corporation of Massachusetts Application December 21, 1945, Serial No. 636,293

8 Claims. (Cl. 192—48)

My present invention relates to clutch means to connect either of two shafts to another member as, for example, in units wherein it is desired to have a common output shaft driven in one direction or the other depending on which of the two shafts is connected to the driving member.

The principal object of my invention is to provide reliable clutch means that are easily manufactured, assembled, and serviced and that are characterized by easy and positive operation and adjustment.

In accordance with my invention, I provide a clutch to couple either one of a pair of concentric shafts to an axially alined member which constitutes a backing plate. A clamping plate is slidable with reference to the backing plate and I provide first and second pressure plates, the first of which has a fixed relation to the backing plate and the second of which is slidable relative to the clamping plate. Clutch discs on each of the shafts are separated from each other by the clamping plate. I also provide a support between the pressure plates movable with the clamping plate which carries first and second sets of thrust members. Shifter mechanism slidable with reference to the shafts has two operative positions and an intermediate inoperative position. In accordance with my invention, as the shifter mechanism is moved into one of its operative positions, the first set of thrust means is wedged into engagement with the first pressure plate whereby the support and the clamping plate are actuated to clamp one of the clutch discs against the backing plate to couple one of the shafts thereto. When the shifter mechanism is moved into its other operative position, the second set of thrust means is wedged into engagement with the second pressure plate whereby the other clutch disc is clamped between it and the clamping plate to couple the other of the shafts to the backing plate.

Such a clutch is easily operated and is positive in its action and may be readily adjusted. In one embodiment of my invention, I form the support in two sections, both of which are threaded into a slide of which the clamping plate may be an integral part and which is preferably slidably mounted on studs fast at one end to the backing plate and rigidly supporting the first pressure plate at their other end. By this construction, the relation between each set of thrust means and the pressure plate with which it coacts may be readily adjusted by threading the section on which it is mounted relative to the slide.

In another embodiment of my invention, the support may be unitary and threaded into the slide to establish the basis of adjustment between the second set of thrust means and its pressure plate. In this embodiment, the first pressure plate comprises an interiorly threaded ring into which I thread a cap having a surface engageable by the first set of thrust means so that by rotating the cap, accurate adjustments are easily attained of the relation between the first set of thrust means and its pressure plate.

In the accompanying drawings, I have shown a reversing unit embodying my invention and illustrating its several novel features and advantages.

Figures 1, 2, 3:
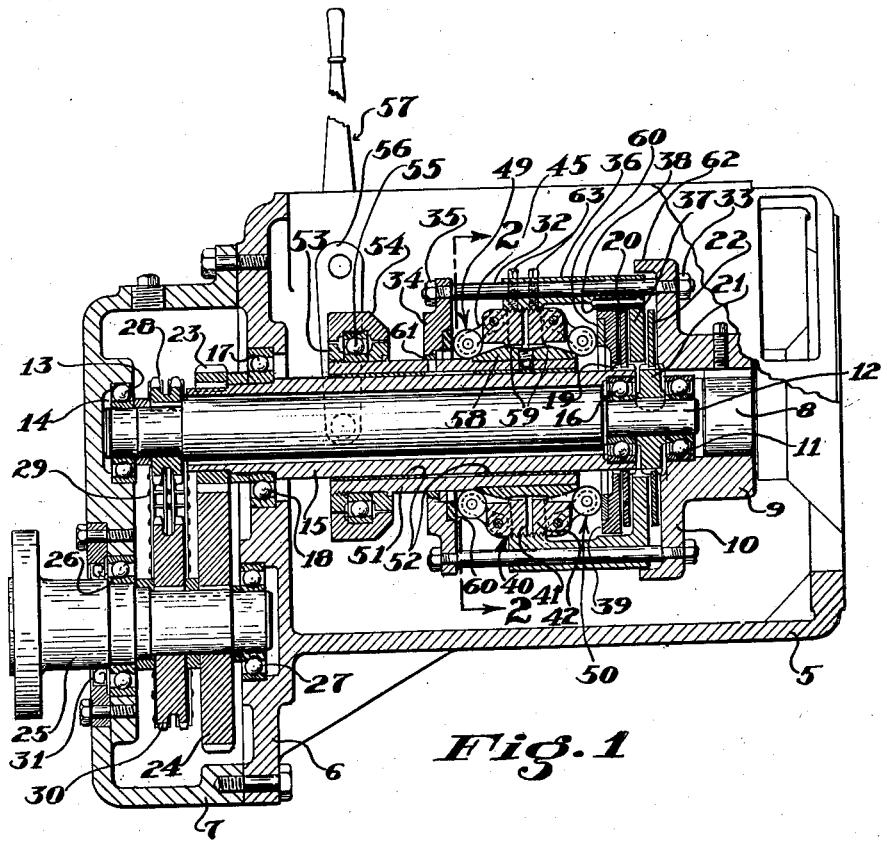
Fig. 1 is a partly sectioned view of a reversing unit in accordance with my invention.
Fig. 2 is a fragmentary section along the lines 2—2 of Fig. 1.
Fig. 3 shows, in a fragmentary section, a modification of my invention.

In the embodiment of my invention shown in the drawings, a casing 5 has bolted to its rear end wall 6 a housing 7. Within the casing 5 and fast on the drive shaft 8 is a hub 9 flanged as at 10 to establish a backing plate and spaced to define with the end of the drive shaft 8 a chamber to accommodate the ball bearing unit 11 on one end of the driven shaft 12. The driven shaft 12 is supported at its other end by a ball bearing unit 13 mounted in the recess 14 in the housing 7. The driven shaft 12 extends through the hollow driven shaft 15 which it supports adjacent its front end by a ball bearing unit 16. Adjacent its other end, the driven shaft 15 is positioned by a ball bearing unit 17 mounted in a port 18 in the casing end wall 6.

The front end of the shaft 15 has teeth 19 slidably supporting the clutch disc 20 and between the ball bearing units 11 and 16, the driven shaft 12 has keyed to it a gear 21 slidably supporting the clutch disc 22. Preferably the gear 21 is of such size that the discs 20 and 22 may be identical.

Within the housing 7, the driven shaft 15 has a gear 23 meshing with a gear 24 fast on the output shaft 25 supported by the bearing unit 26 in the housing 7 and by the bearing unit 27 in the casing end wall 6. The driven shaft 12 has a sprocket 28 connected by a chain 29 to the sprocket 30 on the output shaft 25 which is conventionally sealed as at 31.

By this construction, the output shaft 25 is rotated in one direction when the driven shaft 12 is coupled to the drive shaft 8 and in a reverse direction when the driven shaft 15 and the drive shaft 8 are interconnected.

In accordance with the embodiment of my invention shown in the drawings, I employ studs 32 shouldered adjacent both ends so that they may be rigidly attached to the flange 10 by nuts 33 and extend rearwardly in parallel with the axis of the shafts 12, 15. A first pressure plate 34 is locked to the studs 32 by nuts 35.

I mount on the studs 32 a slide 36 having adjacent its front end a flange 37 constituting a clamping plate. The slide 36 is drilled to establish holes through the clamping plate 37 and channels in the slide to receive the drive pins 38 by which the pressure plate 39 is slidably fastened to the slide 36. The clamping plate 37 is disposed between the clutch discs 20 and 22 so that the clutch disc 21 may be clamped by it against the flange 10 which constitutes a backing plate or the clutch disc 20 may be clamped between it and the pressure plate 39.

At its rear end, the slide 36 is interiorly threaded to receive the exteriorly threaded mount generally indicated at 40 and consisting of two spaced sections 41 and 42 each having its outer end formed with a plurality of ears 43 through which extend pins 44 pivotally interconnecting the ends of pairs of links 45. At their other ends, the pairs of links 45 are interconnected by pins 46 supporting rollers 47. Adjacent links of adjacent pairs are interconnected by springs 48 to overcome centrifugal force and provide positive means for urging the thus established thrust means into their inoperative position. The thrust means carried by the section 41 of the mount 40 are indicated generally at 49 and those carried by the section 42 of the mount are generally indicated at 50.

At 51 I have shown a shifter sleeve spaced from the driven shaft 15 by bushings 52. The shifter sleeve has a ring 53 and a collar 54 separated from each other by the ball bearing unit 55. The collar 54 is connected to a fork 56 under the control of operator actuated shifter mechanism indicated generally at 57.

The shifter sleeve 51 has a cam element 58 fastened thereto. One end of the cam element 58 is shaped to wedge the set of thrust means 49 against the pressure plate 34 to cause the clamping plate 37 to clamp the clutch disc 22 against the backing plate 10 when the shifter sleeve is in one operative position. The other end of the element 58 is similarly shaped to wedge the set of thrust members 50 against the pressure plate 39 thereby to cause the clamping plate 37 to clamp the clutch disc 20 between it and the pressure plate 39 when the shifter sleeve is in the other operative position. Both wedge surfaces of the cam element have high points 59 so that when the shifter sleeve 51 is in either operative position, such positions will be maintained against the action of the springs 48. The springs 48 of each set of thrust means cooperate to center the cam element 58 when the shifter mechanism is manually moved into its neutral or inoperative position.

Both the pressure plate 34 and the pressure plate 39 have hardened insets 60 for engagement by the rollers of the thrust means and preferably I provide a guide bushing 61 between the pressure plate 34 and the shifter sleeve 51. The flange 10 is shaped as at 62 to overlie the end of the support 36 and to relieve the studs 32 from a considerable part of the weight of the mechanism supported thereby so that when the shafts are coupled, any vibration due to lack of balance, is avoided. The clutch of Figs. 1 and 2 may be easily and accurately adjusted. By turning the section 41 of the mount 40 relative to the slide 36, the desired relation between the set of thrust means 49 and the pressure plate 34 may be readily established. By turning the mount section 42 relative to the slide 36, the desired relation between the set of thrust means 50 and the pressure plate 39 may likewise be accurately established. Set screws 63 are provided to lock the sections 41 and 42 to the slide 36.

I may make the mount integral as indicated at 64 in Fig. 3. As the adjustment of the set of thrust means 50 relative to the pressure plate 39 by rotating the mount 64 varies the relation of the set of thrust means 49 to the pressure plate with which they coact, I provide a special pressure plate generally indicated at 65 in Fig. 3. The pressure plate 65 comprises a ring 66 fast on the studs 32. The ring 66 is interiorly threaded to receive a cap 67 which has a hardened inset 60 with which the thrust means 49 engages under the influence of the shifter mechanism.

The cap 67 has a flange 68 which may be formed in any convenient way for engagement by a wrench and has set screws 69 by which it may be locked to the ring 66 to ensure the maintenance of the adjustment.

From the foregoing it will be apparent that clutches in accordance with my invention are of simple and rugged construction ensuring economy in manufacture and durability in use. Easy accurate adjustments are made possible because of my invention so that reliable and positive operation may be readily established and maintained.

What I therefore claim and desire to secure by Letters Patent is:

1. A clutch for a unit having a pair of concentric driven shafts, a flanged driving member axially alined with said shafts and constituting a backing element, a clamping plate slidable relative to said backing element, a first pressure plate supported in a fixed relation to said backing plate, a second pressure plate slidable relative to said clamping plate, a clutch disc on each of said shafts separated from each other by said clamping plate, a mount movable with said clamping plate and located between said pressure plates, a shifter slidable with reference to said shafts and having two operative positions and an intermediate inoperative position, and first and second sets of thrust means carried by said mount, said first set of thrust means being engaged and wedged into contact with said first pressure plate by said shifter as it is moved into one operative position thereby to cause said thrust plate to clamp one of said clutch discs against said backing plate and the other set of thrust means being engaged and wedged into contact with said second pressure plate by said shifter as it is moved into the other operative position thereby to clamp said other clutch disc between it and said clamping plate.

2. A clutch for a unit having a pair of concentric driven shafts, a flanged driving member axially alined with said shafts and constituting a backing element, a first pressure plate, studs anchored to said backing element and rigidly connected to said pressure plate, means including a clamping plate slidably supported by said studs, a second pressure plate slidably suported by said means, a clutch disc on each of said shafts separated from each other by said clamping plate, first and second sets of thrust means pivotally attached to said means and located between said pressure plates, a shifter slidable with reference to said shafts and having two operative positions and an intermediate inoperative position, and said first set of thrust means being engaged and wedged into contact with said first pressure plate by said shifter as it is moved into one operative position thereby to cause said clamping plate to clamp one of said clutch discs against said backing element and the other set of thrust means being engaged and wedged into contact with said second pressure plate by said shifter as it is moved into the other operative position thereby to clamp said other clutch disc between said second pressure plate and said clamping plate.

3. The clutch of claim 2 in which the driving member has an annular flange within which the front end of the slidable plate supporting means slidably fits thereby to relieve the studs from a major part of the weight of the means under the influence of centrifugal force.

4. A clutch for a unit having a pair of concentric driven shafts, a flanged driving member axially alined with said shafts and constituting a backing element, a clamping plate slidable relative to said backing element, a first pressure plate, means attached to said backing element rigidly supporting said pressure plate in a fixed relation to said backing element, a second pressure plate slidable relative to said clamping plate, a clutch disc on each of said shafts separated from each other by said clamping plate, first and second sets of thrust members, mounting means connected rigidly to said clamping plate and pivotally supporting both sets of said thrust means between said pressure plates, a shifter slidable with reference to said shafts and having two operative positions and an intermediate inoperative position, said first set of thrust members being engaged and wedged into contact with said first pressure plate by said shifter as it is moved into one operative position thereby to cause said clamping plate to clamp one of said clutch discs against said backing element and the other set of thrust members being engaged and wedged into contact with said second pressure plate by said shifter as it is moved into the other operative position thereby to clamp said other clutch disc between said second pressure plate and said clamping plate, and means to adjust the relation of either set of thrust means to its pressure plate without interfering with the relation of the other set of thrust means to its pressure plate.

5. A clutch for a unit having a pair of concentric driven shafts, a flanged driving element axially alined with said shafts and constituting a backing element, a first pressure plate, studs anchored to said backing element and rigidly supporting said pressure plate, a slide supported on said studs and including a clamping plate, a clutch disc on each of said shafts separated from each other by said clamping plate, a second pressure plate slidably supported by said slide, said slide having an interiorly threaded portion between said pressure plates, first and second mounts threaded into said portions, first and second sets of thrust means pivotally carried by said first and second mounts to engage respectively with said first and second pressure plates, and shifter means movably axially of said shafts and having first and second operative positions and an intermediate inoperative position, and in either of said operative positions engaging with and wedging one set of thrust means into contact with its pressure plate as determined by the position of its mount in relation to said slide.

6. A clutch for a unit having a pair of concentric driven shafts, a flanged driving element axially alined therewith and constituting a backing element, a first pressure plate supported by said element in predetermined relation thereto, a clamping plate slidably supported by said backing element, a second pressure plate slidable relative to said clamping plate, a clutch disc on each of said shafts between said backing element and said second pressure plate and separated from each other by said clamping plate, first and second sets of thrust means, a mount between said pressure plates and pivotally supporting said sets of thrust means, said mount having a threaded connection to said clamping plate to permit adjustment of said second set of thrust means relative to said second pressure plate, said first plate comprising a ring and an adjusting cap threaded into said ring, said cap having a face engageable by the first set of thrust means, and shifter means operable to wedge either of said sets of thrust means into contact with its pressure plate.

7. In a clutch, a fixed pressure plate, a slidable pressure plate including a mount, a set of thrust arms pivotally carried by said mount for engagement with said fixed pressure plate, shifter means to wedge said thrust means into contact with said fixed pressure plate, said fixed pressure plate comprising a ring and an adjusting cap having a threaded connection with said ring and a face engageable by said thrust means.

8. The clutch of claim 7 in which the cap has a flange, and set screws threaded through the flange to engage with the ring to lock the cap in any selected position.

FRANCIS L. LAVASH.

No references cited.